(12) United States Patent
Noca et al.

(10) Patent No.: US 11,471,001 B2
(45) Date of Patent: Oct. 18, 2022

(54) ASSEMBLY FOR PREPARING AND/OR COOKING FOOD FOR A FOOD APPLIANCE

(71) Applicant: BEABA, Paris (FR)

(72) Inventors: Laurent Noca, Hauterives (FR); Rodolphe Bouhours, Port (FR)

(73) Assignee: BEABA, Paris (FR)

( * ) Notice: Subject to any disclaimer, the term of this patent is extended or adjusted under 35 U.S.C. 154(b) by 634 days.

(21) Appl. No.: 16/130,105

(22) Filed: Sep. 13, 2018

(65) Prior Publication Data

US 2019/0075971 A1 Mar. 14, 2019

(30) Foreign Application Priority Data

Sep. 13, 2017 (FR) ..................................... 17/58505

(51) Int. Cl.
| | |
|---|---|
| *A47J 43/046* | (2006.01) |
| *A47J 27/04* | (2006.01) |
| *A47J 36/20* | (2006.01) |
| *A47J 36/10* | (2006.01) |
| *A47J 36/16* | (2006.01) |
| *A47J 45/06* | (2006.01) |
| *A47J 36/18* | (2006.01) |

(52) U.S. Cl.
CPC ............. *A47J 43/046* (2013.01); *A47J 27/04* (2013.01); *A47J 36/10* (2013.01); *A47J 36/16* (2013.01); *A47J 36/18* (2013.01); *A47J 36/20* (2013.01); *A47J 45/065* (2013.01); *A47J 2027/043* (2013.01)

(58) Field of Classification Search
CPC .................................................... A47J 43/046
USPC ............................................................ 99/339
See application file for complete search history.

(56) References Cited

U.S. PATENT DOCUMENTS 2,507,425 A * 5/1950 Swartout .................. A47J 47/02
    220/592.28
3,559,839 A * 2/1971 Seethaler ............... A47J 27/092
    220/201

(Continued)

FOREIGN PATENT DOCUMENTS

| CN | 105852674 A | 8/2016 |
|---|---|---|
| EP | 1 736 083 A1 | 12/2006 |

(Continued)

OTHER PUBLICATIONS

Sep. 16, 2021 Office Action Issued in Indian Application No. 201814034509.

*Primary Examiner* — Ibrahime A Abraham
*Assistant Examiner* — Spencer H. Kirkwood
(74) *Attorney, Agent, or Firm* — Oliff PLC (57) ABSTRACT

An assembly for preparing and/or cooking food for a kitchen appliance, includes at least in a first configuration: a bowl for preparing and/or cooking food including a first cooking and/or preparation inner volume, the bowl further having at least one handle extending outside of the first inner volume, a cooking basket shaped so as to be positioned inside the first cooking inner volume, the cooking basket having a second cooking inner volume, the basket having at least one gripping member, a cap shaped so as to close the first volume. The assembly has a housing configured to house at least partially the gripping member of the basket, the housing being arranged outside the first inner volume and outside the second inner volume.

12 Claims, 6 Drawing Sheets

(56) References Cited

U.S. PATENT DOCUMENTS

| | | | |
|---|---|---|---|
| 4,917,262 A * | 4/1990 | Mita | A47J 27/002 |
| | | | 220/360 |
| 5,730,045 A * | 3/1998 | Delaquis | A47J 36/08 |
| | | | 99/337 |
| 8,695,838 B1 * | 4/2014 | Montgomery | A47G 21/145 |
| | | | 220/574.1 |
| 2013/0025470 A1 | 1/2013 | Venot et al. | |
| 2019/0090686 A1 * | 3/2019 | Koetz | A23L 5/10 |

FOREIGN PATENT DOCUMENTS

| | | |
|---|---|---|
| WO | 2007/088283 A2 | 8/2007 |
| WO | 2010/133047 A1 | 11/2010 |
| WO | 2018/050975 A1 | 3/2018 |

* cited by examiner

ASSEMBLY FOR PREPARING AND/OR COOKING FOOD FOR A FOOD APPLIANCE

The present invention relates to the field of small appliances configured to heat of food containers and/or cook and/or prepare of food. Preferably, without exclusion, the invention applies to the field of childcare small appliances.

There are numerous small appliances configured in particular to the preparation and the cooking of the food, whether with steam or not, within the same preparation bowl.

For steam cooking, a cooking basket is generally used whose bottom is perforated and which enables the passage of steam. The cooking basket is positioned inside the preparation bowl in which a determined amount of water is poured and which is intended to evaporate by heating the bowl. Conventionally, the cooking basket comprises gripping means enabling handling the latter and transferring the cooked food into the preparation bowl or into another container, once steam cooking is completed.

The gripping means equipping the cooking basket exist in different shapes.

There are cooking baskets equipped with gripping members configured to be contained in the cooking space when the basket is positioned inside the bowl of the appliance either by the even geometry of the gripping members or thanks to hinge elements enabling folding of the gripping members. A major drawback of these gripping members is that they lie in the cooking space during cooking and are therefore heated by steam. Thus, even though these members are coated with a protective non-conductive layer, they can be hardly handled as they are very hot, which complicates the transfer of food and they occupy space within the cooking volume.

Some appliances are equipped with an external accessory for cooperating with hooking areas integrated into the cooking basket. Thus, after cooking, the external accessory is inserted or clipped onto the hooking areas of the basket, which allows removing the cooking basket without any risk of burning. However, the cooperation of the external accessory with the hooking areas is not easy and the quality of the connection between the hooking areas and the external accessory does not simplify the cooking basket handling. Moreover, it is necessary to keep the external accessory nearby the cooking appliance.

Some other appliances are designed with a cooking basket comprising a fixed handle external to the bowl and emerging via a recess in the upper portion of the preparation bowl. This configuration is very advantageous because during cooking and after cooking the handle remains cool and the basket can be easily handled after cooking. However, this configuration also has a major drawback because, when the basket is in the bowl, the recess formed in the upper portion of the bowl is filled in a more or less tight manner by the handle of said basket, but when the basket is not in the bowl, the recess is not filled. In this configuration where the recess is empty, when blending or cooking food, without the basket, there is a risk of food or steam leakage by projection, thereby making cooking less effective and longer.

In the present invention, by a fixed element M, is meant a non-removable element, whether attached or not.

The invention aims at overcoming all or part of the aforementioned drawbacks and in particular at enabling an easy handling of the cooking basket after cooking, while preserving tightness of the bowl even when the bowl is not equipped with a cooking basket.

To this end, an object of the invention is a assembly for preparing and/or cooking food for a kitchen appliance, comprising at least in a first configuration:
- a bowl for preparing and/or cooking food including at least one bottom, at least one lateral wall extending from the bottom in a substantially secant direction, the lateral wall and the bottom delimiting a first cooking and/or preparation inner volume, the bowl further comprising at least one handle extending outside of the first inner volume,
- a cooking basket shaped so as to be positioned inside the first cooking inner volume, the cooking basket comprising a perforated bottom and at least one lateral wall delimiting with the bottom a second cooking inner volume, the basket comprising at least one gripping member,
- a cap shaped so as to close the first inner volume, characterized in that the assembly comprises a housing configured to house at least partially the gripping member of the basket, said housing being arranged outside the first inner volume and outside the second inner volume, and in that said housing is isolated at least partially from the first inner volume and second inner volume of the assembly.

Thanks to the invention, the gripping member of the basket can be easily handled and enables the transfer of food from the cooking basket into the bowl without any risk of burning and in a simple way. Indeed, the gripping member is positioned outside the (first and second) cooking inner volumes, which allows avoiding the cooking steam heating up the gripping member and this advantage is enhanced by the fact that when the gripping member of the basket is housed in the housing, the housing is isolated from the (first and second) cooking inner volumes, so that steam could not insinuate into the housing during cooking and when the basket is in place.

In the present invention, by «a preparation of food», are meant the steps prior to a cooking of the food such as blending, mixing, cutting, etc. Thus, a bowl for preparing and cooking food allows carrying out both the steps of preparing food and cooking said food.

In the present invention, by «isolated housing», is meant a housing which is separate from the first and second inner volumes in a totally tight or partially tight manner.

In the present invention, by «partially tight», is meant a relative tightness so that a small (negligible) portion of steam can be introduced into the housing yet without significantly heating up the gripping member so as to make it unseizable because of risks of burning and discomfort.

In the present invention, by «first configuration of the assembly», is meant a configuration in which the basket is positioned inside the first inner volume of the bowl, regardless of the position of the cap (open or closed).

In the present invention, by «second configuration of the assembly», is meant a configuration in which the basket is outside the first inner volume, regardless of the position of the cap (open or closed).

According to an embodiment of the invention, the cap is shaped so as to tightly close the first inner volume in the second configuration of the assembly.

According to an embodiment of the invention, the housing cooperates by form-fitting with the gripping member of the basket.

According to an embodiment of the invention, the housing comprises a first portion formed on the handle of the bowl and a second portion formed on a first portion of the cap.

Preferably, the first portion of the cap may be a gripping element constituting at least partially the second portion of the housing.

According to an embodiment of the invention, the bowl comprises a recess formed on the lateral wall of the bowl.

According to an embodiment of the invention, the recess forms a notch on the upper edge of the lateral wall of the bowl.

According to an embodiment of the invention, the recess comprises a first section extending at the level of the handle of the bowl and a second section extending beyond the handle of the bowl. Advantageously, the second section of the recess extends beyond the handle in the counterclockwise direction with respect to the bowl. Advantageously, the first section and the second section are adjacent to each other.

According to an embodiment of the invention, the recess is configured to delimit the angular range of rotational displacement of the basket inside the bowl. Indeed, when the gripping member of the basket is opposite the handle of the bowl in the first section of the bowl, the gripping member is displaceable only by sliding and when the gripping member of the basket is in the second section of the bowl, the gripping member is seizable and allows removing the cooking basket from the bowl.

Thus, according to an embodiment of the invention, the width of the first section of the recess corresponding to the width of the gripping member of the basket and preferably also corresponds to the width of the handle of the bowl.

According to an embodiment of the invention, the width of the second section of the recess is also or substantially larger than the width of the gripping member of the basket.

According to an embodiment of the invention, in the first configuration of the assembly, the first section of the recess is filled at least partially by the gripping member of the basket. Preferably, in the first configuration of the assembly, the first section of the recess is completely filled by the gripping member of the basket.

According to an embodiment of the invention, in the second configuration of the assembly, the first section of the recess is tightly closed by the first portion of the cap. In the second configuration of the assembly, steam being cooked can rise up into the housing configured to house the gripping member but cannot come out thanks to the first portion of the cap, which closes said housing. Thus, even if there is no basket in the assembly, cooking is effective and the assembly remains tight without any risk of burning or food projection.

According to an embodiment of the invention, the cap comprises a second portion on which is formed a closure flap configured to close a portion of the recess and preferably the second section of the recess.

According to an embodiment of the invention, in the first configuration of the assembly and/or in the second configuration of the assembly, the second section of the recess is closed in a substantially tight manner by the closure flap.

In the present invention, by «substantially tight», is meant a closure which may be totally sealed, called hermetic, or a closure which let a negligible amount of fluid to pass.

According to an embodiment of the invention, the second portion of the cap is arranged adjacent to the first portion of the cap.

According to an embodiment of the invention, the handle of the bowl comprises a portion for connection with the bowl and a gripping portion, the first portion of the housing being formed on an accommodated portion of the connecting portion of the handle.

According to an embodiment of the invention, the accommodated portion comprises a stop configured to delimit at least partially the housing of the gripping member. Advantageously, the stop also allows limiting the rotational displacement of the basket inside the bowl about a longitudinal axis X-X of the assembly.

According to an embodiment of the invention, the housing of the gripping member is delimited at the upper portion by the first portion of the cap, at the lower portion by an accommodated portion of the handle of the bowl, laterally by a stop formed on the accommodated portion of the handle of the bowl and by the first portion of the cap, at the distal portion with respect to the bowl by the first portion of the cap which closes said housing from the outside and at the proximal portion with respect to the bowl by the recess formed on the bowl.

According to an embodiment of the invention, the bowl has a generally cylindrical shape.

According to an embodiment of the invention, the cap has a generally cylindrical shape.

Advantageously, the cylindricity of the bowl and the cylindricity of the cap match together so as to form an aesthetic and compact assembly.

According to an embodiment of the invention, the bowl comprises a bottom on which is mounted a rotating drive shaft configured to receive at least one cutting and/or mixing element.

According to an embodiment of the invention, the bowl comprises a pouring spout.

According to an embodiment of the invention, the handle of the bowl further comprises a locking element configured to cooperate with a complementary locking element formed on the cap.

According to an embodiment of the invention, the locking element is an orifice shaped so as to cooperate with the complementary locking element by form-fitting.

According to an embodiment of the invention, the handle of the bowl is fixed.

According to an embodiment of the invention, the handle of the bowl is a part attached on the bowl.

According to an embodiment of the invention, the handle of the bowl may comprise one or several areas having an insulating coating and/or a grip.

According to an embodiment of the invention, the handle of the bowl is made of plastic, for example of polypropylene (PP) or of acrylonitrile butadiene styrene (ABS).

According to an embodiment of the invention, the cap comprises at least one third portion on which is formed a closure tab configured to close the pouring spout of the bowl.

According to an embodiment of the invention, the cap is closed by rotation in the clockwise direction. Advantageously, when the cap is positioned on the bowl containing the basket and the cap is turned in the clockwise direction, the first portion of the cap guides the gripping member of the basket into the first portion of the housing in order to fill the first section of the recess and the closure flap formed on the second portion of the cap is brought to tightly close the second section of the recess.

According to an embodiment of the invention, the cap further comprises a complementary locking element configured to cooperate with a locking element formed on the handle of the bowl.

According to an embodiment of the invention, the complementary locking element is a protruding lug extending tangentially to the cap and preferably arranged on a portion of the first portion of the cap.

According to an embodiment of the invention, the cap comprises an inner recess configured to be positioned opposite the recess formed on the bowl, when the cap closes the first inner volume.

According to an embodiment of the invention, the inner recess is formed on the bottom of the cap configured to be in contact with the bowl.

According to an embodiment of the invention, the inner recess is configured to delimit an angular displacement of a protruding leg formed on the basket.

According to an embodiment of the invention, the basket has a generally cylindrical shape.

According to an embodiment of the invention, the lateral wall and the bottom of the basket form a vat.

According to an embodiment of the invention, the vat may be made of stainless steel or of plastic, for example of polypropylene (PP) or of glass.

According to an embodiment of the invention, the gripping member may consist of a tab or a handle.

According to an embodiment of the invention, the basket further comprises a protruding leg formed substantially opposite the gripping member.

Advantageously, the basket is held in suspension inside the first inner volume of the bowl only by two supports, the first support corresponding to the gripping member and the second support corresponding to the protruding leg. This configuration allows avoiding the need for a circumferential rib formed on the upper edge of the basket cooperating with the upper edge of the bowl.

Alternatively, the basket comprises a circumferential rib configured to bear on the upper edge of the bowl in order to hold the basket in suspension inside the inner volume.

According to an embodiment of the invention, the gripping member is fixed.

According to an embodiment of the invention, the gripping member extends radially with respect to the lateral wall of the basket.

According to an embodiment of the invention, the gripping member is overmolded on the lateral wall.

According to an embodiment of the invention, the gripping member is overmolded on the upper edge of the lateral wall.

According to an embodiment of the invention, the gripping member and a belt covering the circumference of the upper edge of the lateral wall are overmolded.

According to an embodiment of the invention, the gripping member and/or the belt is made of plastic, for example of polypropylene (PP) or of an elastomer.

According to an embodiment of the invention, the assembly for preparing and/or cooking food for a kitchen appliance comprises, at least in a second configuration:
- a bowl for preparing and/or cooking food including at least one bottom, at least one lateral wall extending from the bottom in a substantially secant direction, the lateral wall and the bottom delimiting a first cooking and/or preparation inner volume, the bowl further comprising at least one handle extending outside of the first inner volume,
- a cap shaped so as to close the first inner volume, characterized in that the assembly comprises a housing configured to house at least partially a gripping member of a cooking basket in a first configuration according to the invention, said housing being arranged outside the first inner volume and closed by a first cap portion in a substantially tight manner.

According to an embodiment of the invention, in the second configuration of the assembly, the first section of the recess is tightly closed by the first portion of the cap. In the second configuration of the assembly, steam being cooked can rise up into the housing configured to house the gripping member but cannot come out thanks to the first portion of the cap which closes said housing. Thus, even if there is no basket in the assembly, cooking is effective and the assembly remains tight without any risk of burning or food projection.

The invention will be better understood thanks to the description hereinafter, which relates to embodiments according to the present invention, given as non-limiting examples and explained with reference to the appended schematic figures. The appended schematic figures are listed hereinbelow.

Figures 1, 2:
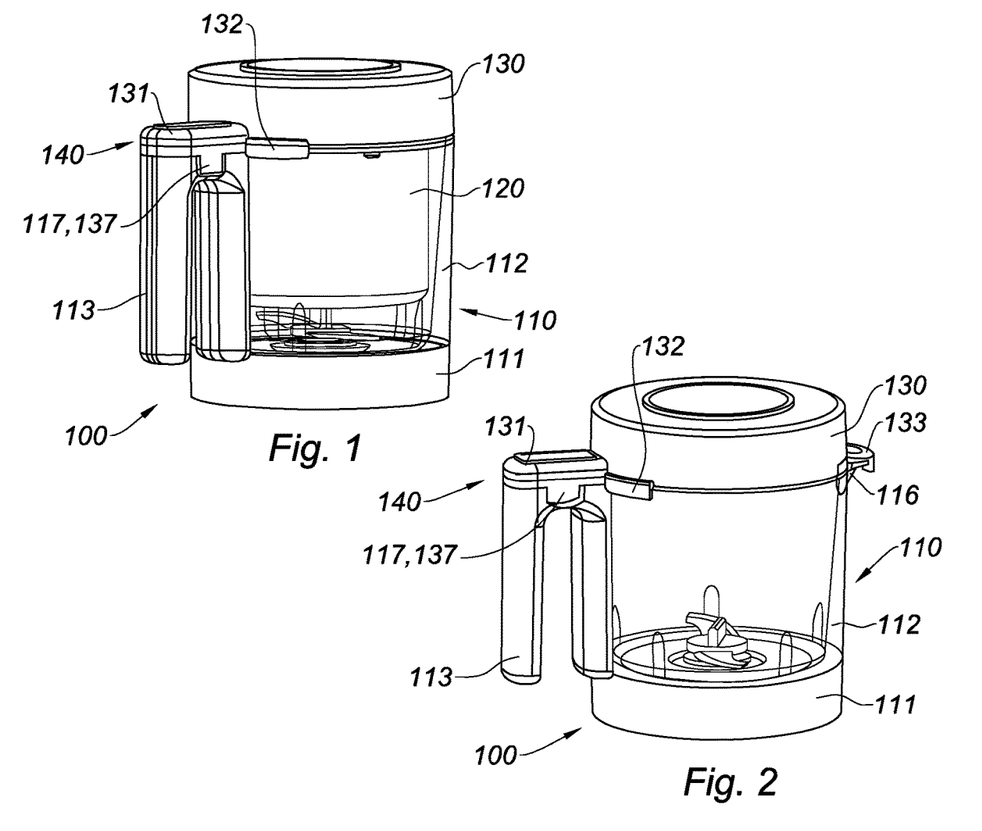
FIG. 1 is a perspective view of the assembly according to the invention in the first configuration.
FIG. 2 is a perspective view of the assembly according to the invention in the second configuration.
Figure 3:
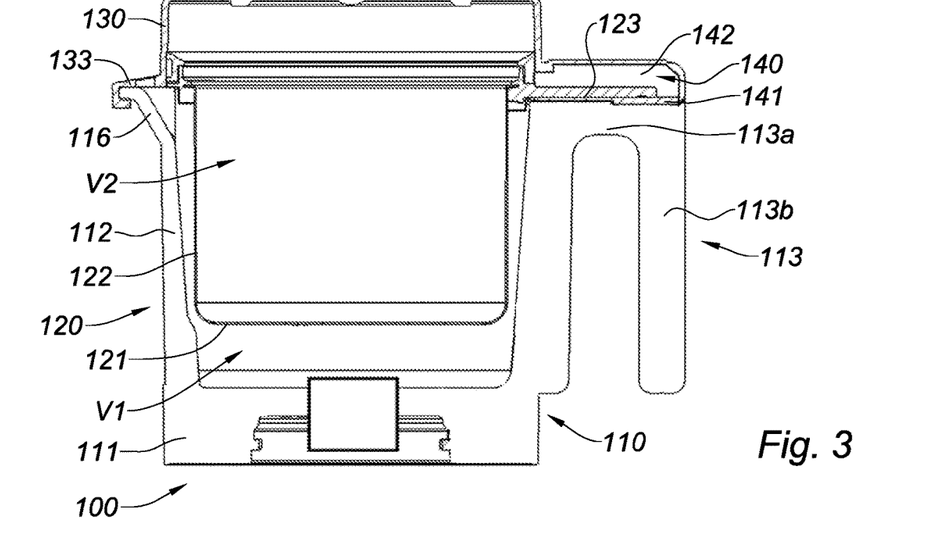
FIG. 3 is a sectional view of the assembly represented in FIG. 1.

Referring in particular to FIGS. 1 to 3, the assembly 100 for preparing and/or cooking food for a kitchen appliance according to the invention comprises a bowl 110 for preparing and/or cooking food, a cooking basket 120, a cap 130. In a first configuration of the assembly 100 represented in particular in FIGS. 1 and 3, the basket 120 is positioned inside the bowl 110. In a second configuration of the assembly 100 represented in FIG. 2, the basket 120 is outside the bowl 110 and therefore not represented. Advantageously, the bowl 110 has a generally cylindrical shape.

As illustrated in FIGS. 1, 2, 4, 5, 7, the bowl 110 includes at least one bottom 111, at least one lateral wall 112 extending from the bottom 111 in a direction substantially secant to the bottom 111, the lateral wall 112 and the bottom 111 delimiting a first cooking and/or preparation inner volume V1. The bowl 110 further comprises a fixed handle 113, extending outside of the first inner volume V1. At the bottom 111, is mounted a rotating drive shaft 114 configured to receive at least one cutting and/or mixing element 115. Furthermore, the bowl 110 comprises a pouring spout 116.

As shown in particular in FIGS. 4 and 6 to 8, the handle 113 of the bowl comprises a portion 113a for connection with the bowl 110 and a gripping portion 113b. The connecting portion 113a extends in a plane substantially secant and substantially perpendicular with respect to the longitudinal axis according to which the lateral wall 112 extends. The gripping portion 113b extending in a plane substantially secant and preferably perpendicular to the plane in which extends the connecting portion 113a and substantially tangent to the lateral wall 112. The handle 113 of the bowl further comprises a locking element 117 configured to cooperate with a complementary locking element 137 formed on the cap 130. In the illustrated example, the locking element 117 is an orifice shaped so as to cooperate with the complementary locking element 137 by form-fitting.

Figure 4:
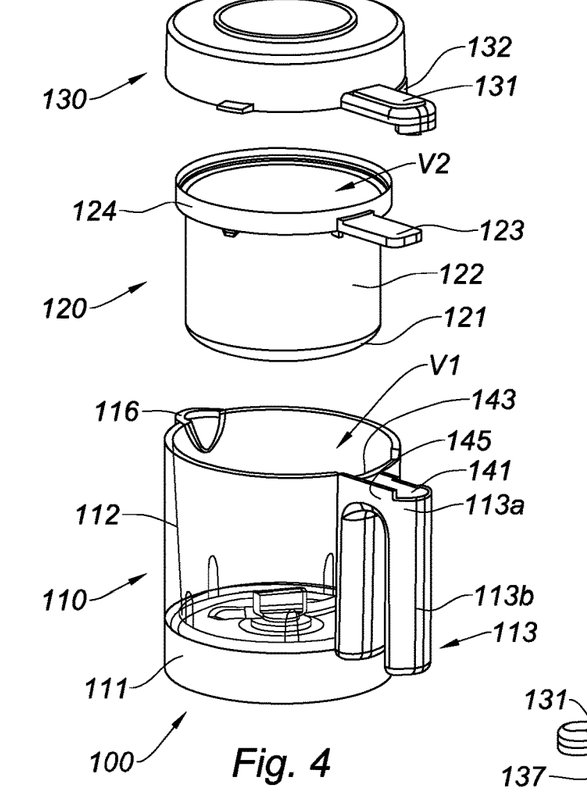
FIG. 4 is an exploded perspective view according to a first angle of view.
Figure 5:
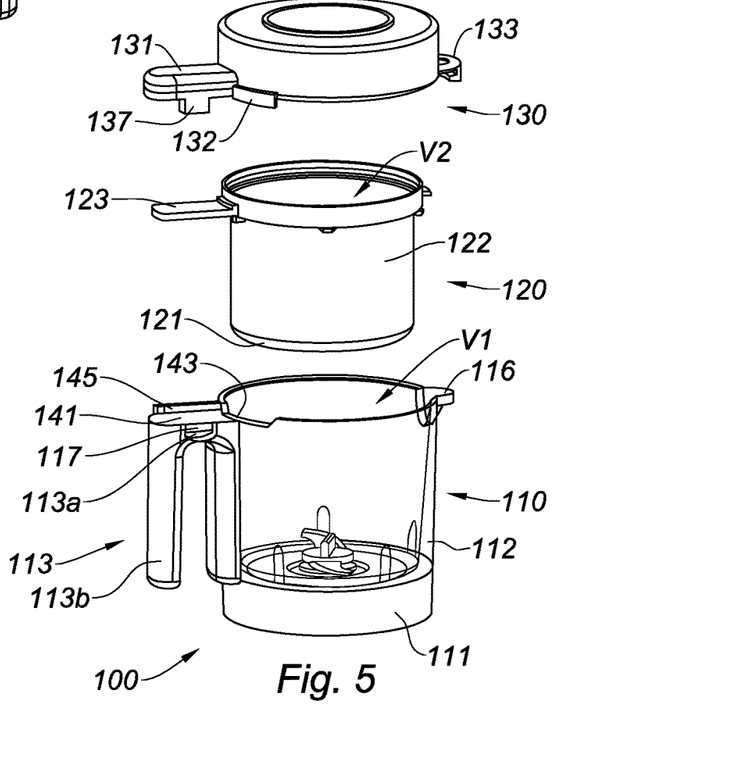
FIG. 5 is an exploded perspective view according to a second angle of view.
Figure 6:
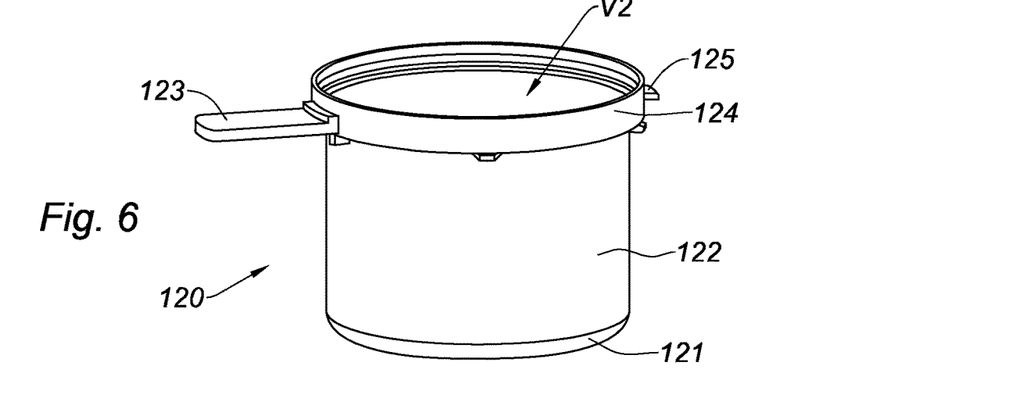
FIG. 6 is a perspective view of the basket according to a first embodiment of the assembly according to the invention.

As illustrated in particular in FIGS. 1, 2, 4 to 6, the cooking basket 120 comprises a perforated bottom 121 and at least one lateral wall 122 delimiting with the perforated bottom 121 a second cooking inner volume V2. Furthermore, the basket 120 comprises at least one fixed gripping member 123. Advantageously, the basket 120 has a generally cylindrical shape. According to the invention, the lateral wall 122 and the bottom 121 of the basket 120 form a vat. As illustrated in FIG. 6 or in FIGS. 11 and 13, the gripping member 123 may consist of a tab or a handle.

As shown in particular in FIG. 6, the gripping member 123 extends radially with respect to the lateral wall 122 of the basket 120. Furthermore, the basket 120 comprises a belt 124 covering the circumference of the upper edge of the lateral wall 122.

In the example illustrated in FIGS. 1 to 6, 11 to 14, the gripping member 123 is a tab. In a non-represented variant, the gripping member 123 may be a handle whose gripping portion lies as a build-up portion of the gripping portion 113b of the handle 113 of the bowl 110 or in a space formed on the gripping portion 113b of the handle 113 of the bowl 110.

As illustrated in particular in FIG. 6, the basket 120 further comprises a protruding leg 125 formed substantially opposite the gripping member 123.

Figure 12:
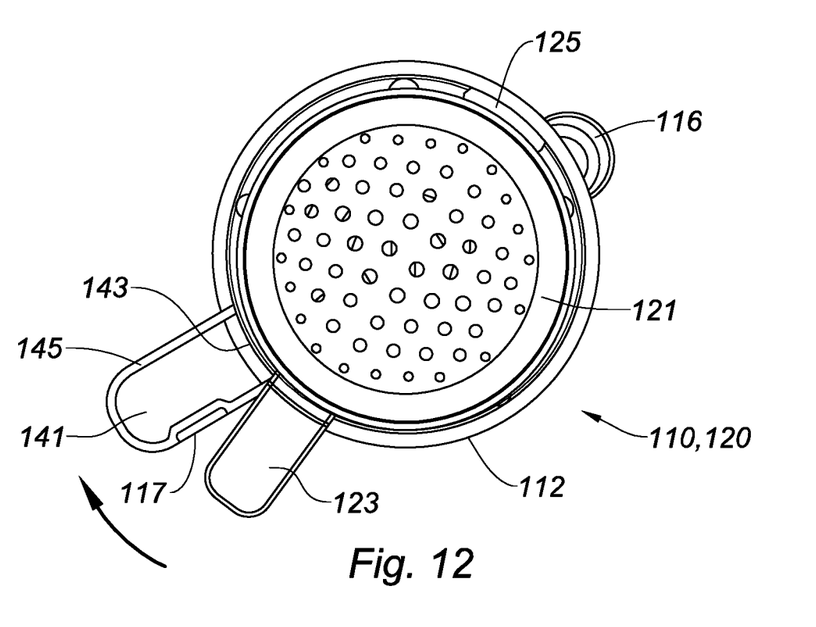
FIG. 12 is a top view of FIG. 11.

As illustrated in FIG. 12, the basket 120 is held inside the first inner volume V1 only by two supports, the first support corresponding to the gripping member 123 and the second support corresponding to the protruding leg 125.

According to the invention, the assembly 100 also comprises a cap 130 for tightly closing the first inner volume V1 in the first configuration of the assembly 100 and the second configuration of the assembly 100. As illustrated in FIGS. 1, 2, 4, 5, 9 and 10, the cap 130 has a generally cylindrical shape. Furthermore, the cap comprises a first portion 131 which may form a gripping element of the cap 130. In addition, the cap 130 comprises a second portion forming a closure flap 132. The second portion 132 of the cap 130 is arranged adjacent to the first portion 131 of the cap 130. Finally, the cap 130 comprises at least one third portion 133 on which is formed a closure tab 133 configured to close the pouring spout 116 of the bowl 110, the closure tab 133 may be foldable as shown in FIG. 4. Advantageously, the cap 130 is closed by rotation in the clockwise direction.

Figure 10:
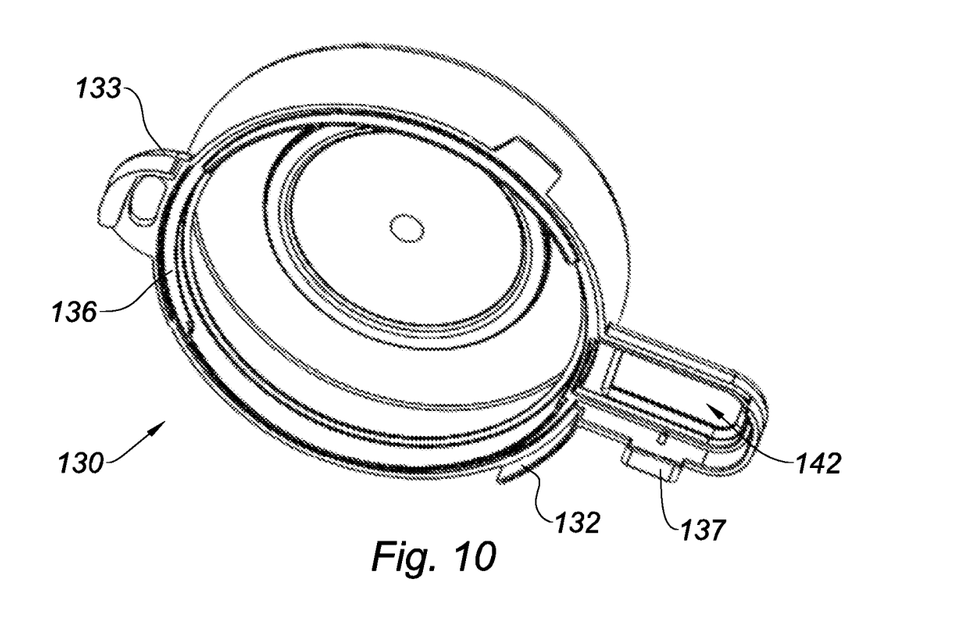
FIG. 10 is a bottom perspective view of the cap according to the invention.

As shown in particular in FIG. 5, the cap 130 comprises a complementary locking element 137 configured to cooperate with a locking element 117 formed on the handle 113 of the bowl 110. The complementary locking element 137 is a protruding lug extending tangentially to the cap 130 and preferably arranged on a portion of the first portion 131 of the cap 130. Furthermore, the cap 130 comprises an inner recess 136 configured to be positioned opposite the recess 143 formed on the bowl 140, when the cap 130 closes the first inner volume V1. The inner recess 136 is formed on the bottom of the cap 130 configured to be in contact with the bowl 110 as shown in FIG. 10. The inner recess 136 is configured to cooperate with the protruding leg 125 of the basket 120.

As illustrated in FIG. 3, the assembly 100 comprises a housing 140 shaped so as to house at least partially the gripping member 123 of the cooking basket 120 outside of the first inner volume V1 and of the second inner volume V2 in the first configuration of the assembly 100 as illustrated in FIG. 1. According to the invention, the housing 140 is formed between the handle 113 of the bowl and the first portion 131 of the cap 130 and cooperates by form-fitting with the gripping member 123 of the basket 120.

More particularly and as illustrated in FIGS. 3 and 4, the housing 140 comprises a first portion 141 formed on the handle 113 of the bowl 110, and a second portion 142 formed on the first portion 131 of the cap 130. As shown in FIGS. 3, 4 and 6 to 8, the first portion 141 of the housing 140 is formed on the connecting portion 113a of the handle 113. In addition, the first portion 141 of the housing 140 comprises a stop 145 configured to delimit at least partially the housing 140 of the gripping member 123.

Figure 7:
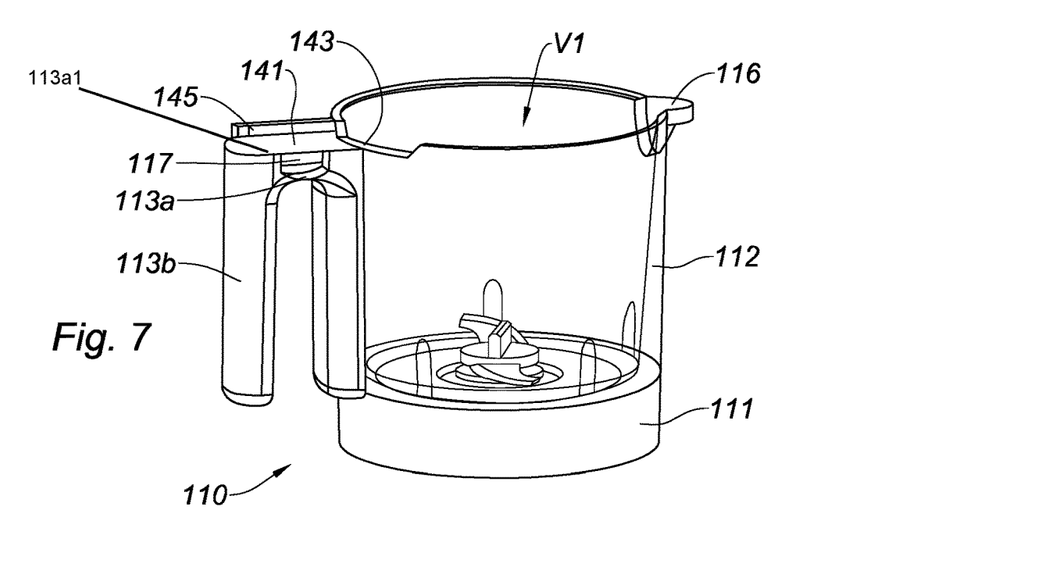
FIG. 7 is a perspective view of the bowl according to the first embodiment of the assembly according to the invention.
Figure 8:
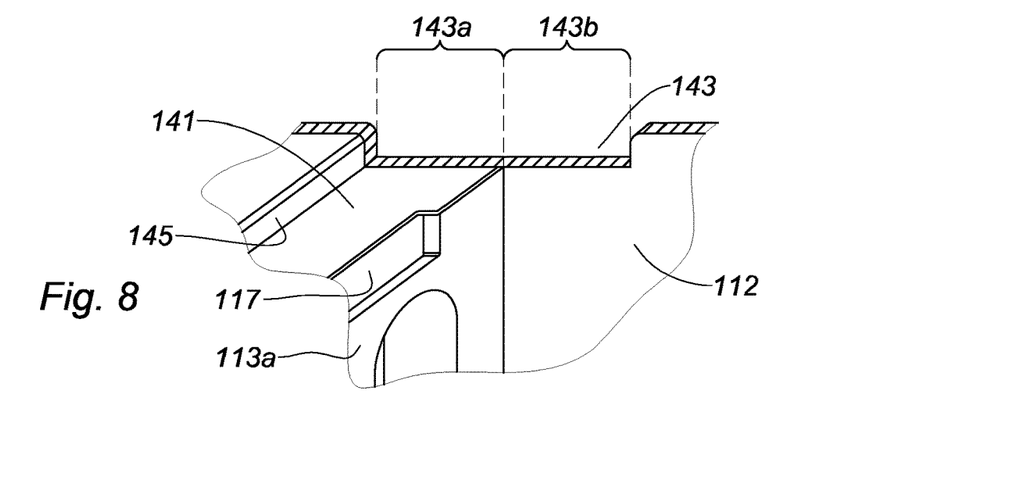
FIG. 8 is a detail view of the recess of the bowl according to the invention.
Figure 9:
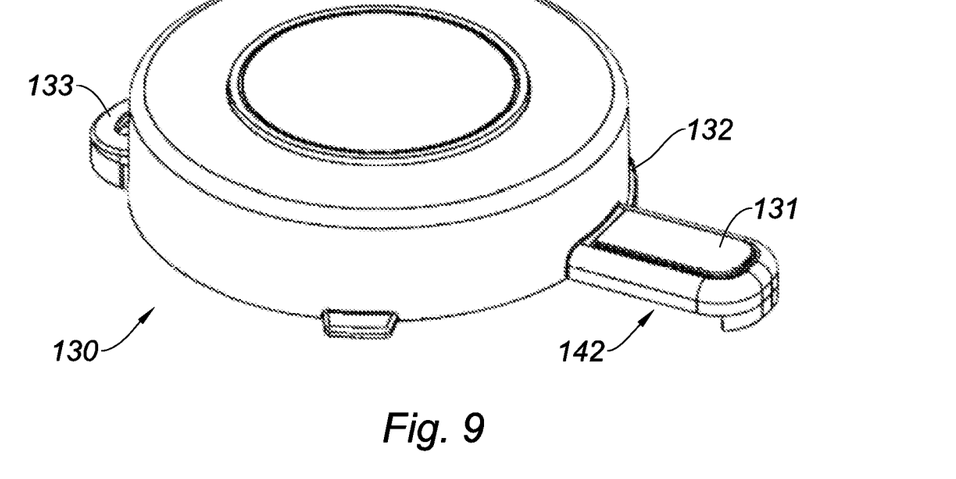
FIG. 9 is a top perspective view of the cap according to the invention.

The housing 140 further comprises a recess 143 formed on the lateral wall 112 of the bowl 110 as illustrated in FIG. 7. As shown in FIG. 7, the recess 143 forms a notch on the upper portion of the lateral wall 112 of the bowl 110. As illustrated in FIG. 8, the recess 143 comprises a first section 143a extending at the level of the handle 113 of the bowl 110, and a second section 143b extending beyond the handle 113 of the bowl 110.

In order to close the assembly 100 according to the invention in the first configuration, there are several possibilities.

Figure 11:
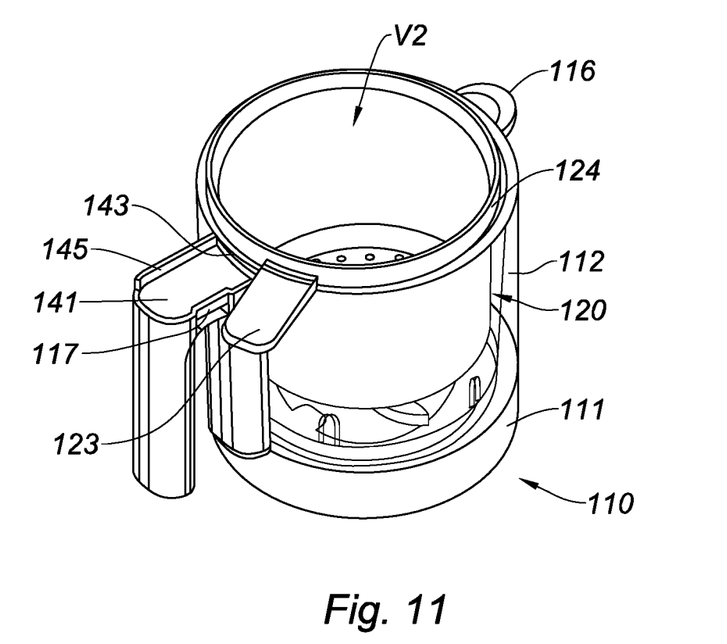
FIG. 11 is a perspective view of the bowl and of the basket according to the invention.

The first possibility consists in positioning the basket 120 inside the first inner volume V1 and in placing the gripping member 123 of the basket 120 in the recess 143 as illustrated in FIGS. 11 and 12. Then, the gripping member 123 is pushed in the clockwise direction in the first portion 141 of the housing 140 against the stop 145 and we close with the cap 140 whose closure flap 132 is brought to tightly close the second section of the recess 143 and whose first portion 131 is brought to close the housing 140 and the locking element 117 cooperates with the complementary locking element 137.

Figure 13:
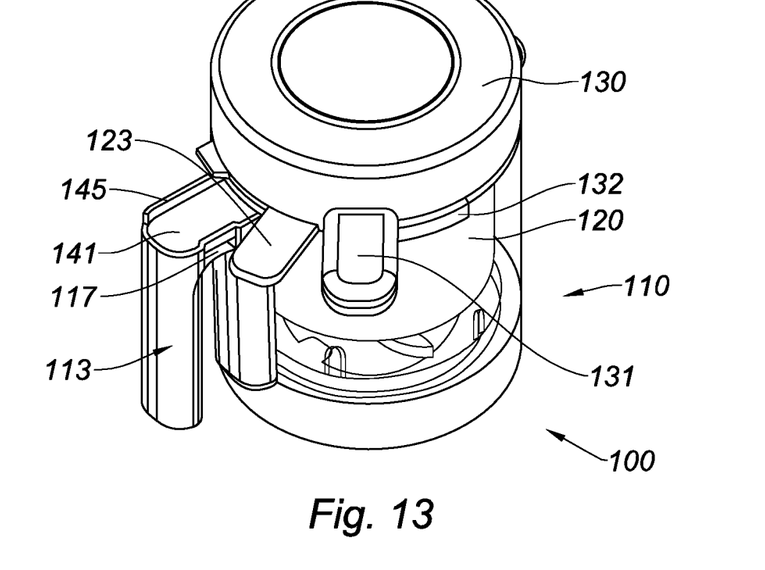
FIG. 13 is a perspective view of the assembly in the first configuration according to the invention.
Figure 14:
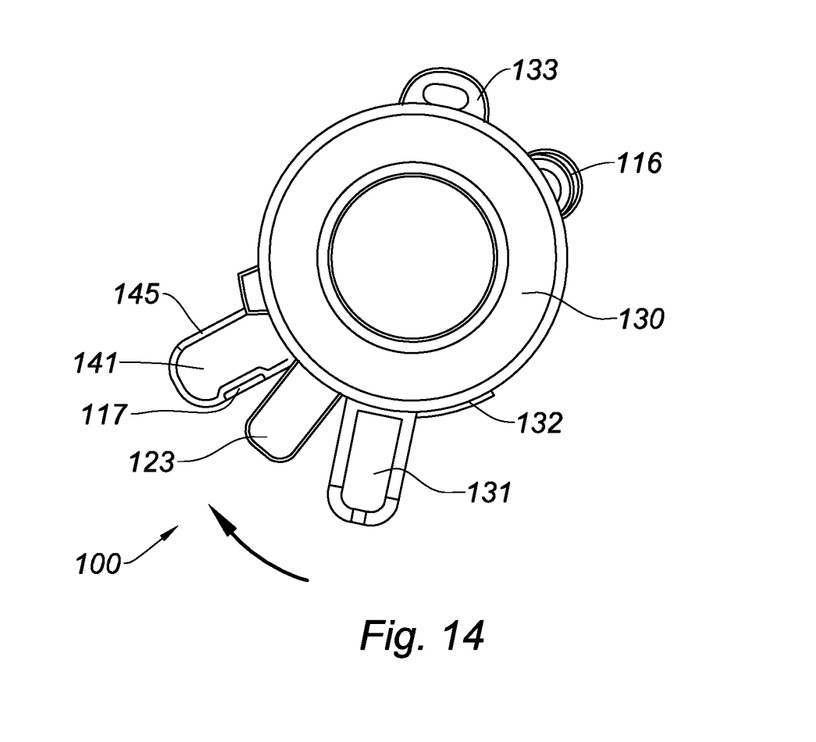
FIG. 14 is a top view of FIG. 13.

In a second possibility illustrated in FIGS. 13 and 14, the basket 120 is placed inside the first inner volume V1, we cover with the cap 130 and close by turning the cap in the clockwise direction, the gripping member 123 will automatically fit into the first portion 141 of the housing 140 because it is pushed by the first portion 131 of the cap 130. The flap closes the second section of the recess 143 and the locking element 117 cooperates with the complementary locking element 137.

In order to open the assembly 100 according to the invention in the first configuration, the cap 130 is pivoted in the counterclockwise direction, so that the housing 140 of the gripping member 123 of the basket 120 comes out from the accommodated portion 113a1 in the connecting portion 113a of the grip 113 of the bowl 110. Then, the gripping member 123 still positioned at least partially in the first section of the recess 143 is brought to slide in the counterclockwise direction, until the gripping member 123 lies totally or almost totally in the second section of the recess 143 and becomes seizable. By pivoting the cap 130, the closure flap 132 no longer closes the second section of the recess 143 and the complementary locking element 137 is separated from the locking element 117. Thus, by simply pivoting the cap, the gripping member of the basket becomes accessible and seizable and in particular thanks to the fact that, during the closure of the assembly, the gripping member 113 reaches the stop 145 formed on the accommodated portion 113a1 of the connecting portion 113a of the handle 113 before the locking element 117 cooperates with the locking element 137. Thus, when locking the cap 130 on the handle 113 of the bowl 110, the gripping member 123 in the housing 140 exerts a slight pressure on the stop 145 which, during opening, enables an almost automatic separation of the gripping member 123.

In the second configuration of the assembly 100, the first section of the recess 143 is tightly closed by the first portion 131 of the cap 130 and the second section of the recess 143 is tightly closed by a flap formed on a second portion of the cap 130.

Of course, the invention is not limited to the embodiments described and represented in the appended figures. Modifications are still possible, in particular with regards to the constitution of the various elements or by substitution with technical equivalents, yet without departing from the scope of the invention.

The invention claimed is:

1. An assembly comprising:
   a bowl that includes:
      a bottom;
      a first lateral wall that extends from the bottom in a first direction, the bottom and the first lateral wall delimiting a first inner volume; and
      a handle that extends outside of the first inner volume;
   a cap shaped so as to close the first inner volume;
   a cooking basket configured so as to be arranged inside the first inner volume, the cooking basket including a perforated bottom, a second lateral wall delimiting with the perforated bottom a second inner volume, and a gripping member; and
   a housing configured to house at least partially the gripping member of the cooking basket, the housing being arranged outside the first inner volume and outside the second inner volume, and the housing being isolated from the first inner volume and second inner volume,
   wherein the housing cooperates by form-fitting with the gripping member of the cooking basket to isolate the gripping member from an area outside the assembly and to provide a sealing between the first and second inner volumes and the area outside the assembly;
   wherein the housing comprises a first portion formed on the handle of the bowl and a second portion formed on the cap;
   wherein the first lateral wall has an upper edge defining an aperture that opens in the first inner volume; and
   wherein the aperture forms a recess that is open in the first portion of the housing so that:
      in a first configuration, a section of the recess is completely filled by the gripping member of the cooking basket with the gripping member located outside of the housing, and
      in a second configuration, the section of the recess is tightly closed by the cap.

2. The assembly according to claim 1, wherein the recess is configured to delimit an angular range of rotational displacement of the cooking basket inside the bowl.

3. The assembly according to claim 2,
   wherein the recess comprises a first section extending at a level of the handle of the bowl and a second section extending beyond the handle of the bowl, and
   wherein the second section is the section of the recess.

4. The assembly according to claim 1,
   wherein the recess is configured to delimit an angular range of rotational displacement of the cooking basket inside the bowl, and
   wherein the handle of the bowl comprises a connecting portion for connection with the bowl and a gripping portion, the first portion of the housing being formed on an accommodated portion of the connecting portion of the handle.

5. The assembly according to claim 4, wherein the accommodated portion comprises a stop configured to delimit at least partially the housing.

6. The assembly according to claim 1, wherein the handle of the bowl further comprises a locking element configured to cooperate with a complementary locking element formed on the cap.

7. The assembly according to claim 2,
   wherein a closure cap is formed on the cap with the closure cap being configured to close the section of the recess.

8. The assembly according to claim 1, wherein the housing is arranged outside the first inner volume and closed by a first cap portion.

9. An assembly comprising:
   a bowl that includes:
      a bottom;
      a first lateral wall that extends from the bottom in a first direction, the bottom and the first lateral wall delimiting a first inner volume; and
      a handle that extends outside of the first inner volume;
   a cap shaped so as to close the first inner volume; and
   a housing arranged outside the first inner volume, the housing being defined and formed between the handle of the bowl and a first portion of the cap,
   wherein the bowl comprises a recess extending on an angular range and along a circumferential direction of the bowl, the recess opening in the housing,
   wherein the recess comprises a first section extending at a level of the handle of the bowl and a second section extending beyond the handle of the bowl, the second section extending the first section along the circumferential direction of the bowl,
   wherein, in a first configuration when the bowl is assembled with the cap, the housing and the second section of the recess are open, and
   wherein, in a second configuration when the bowl is assembled with the cap, the housing is closed and the second section of the recess is closed by the cap.

10. An assembly comprising:
    a bowl that includes:
       a bottom;
       a first lateral wall that extends from the bottom in a first direction, the bottom and the first lateral wall delimiting a first inner volume; and
       a handle that extends outside of the first inner volume; and
    a cap shaped so as to close the first inner volume,
    wherein the cap comprises a first portion configured to form a gripping member of the cap,
    wherein the first portion of the cap cooperates with the handle of the bowl to form a closed housing,
    wherein the bowl comprises a recess extending along an angular range,
    wherein the recess is formed on the first lateral wall of the bowl and beyond the handle of the bowl along the circumferential direction of the first lateral wall, and
    wherein the cap comprises a closure cap extending beyond the first portion along a circumferential direction and being configured to close the recess.

11. The assembly according to claim 9, further comprising:
- a cooking basket configured so as to be arranged inside the first inner volume, the cooking basket including a perforated bottom, a second lateral wall delimiting with the perforated bottom a second inner volume, and a gripping member,
- wherein the housing is configured to house at least partially the gripping member of the cooking basket, the housing being isolated from the first inner volume and second inner volume, and
- wherein an angular range of the recess delimiting a rotational displacement of the cooking basket inside the bowl and a rotational displacement of the gripping member inside the recess along the circumferential direction of the bowl.

12. An assembly according to claim 10, further comprising:
- a cooking basket configured so as to be arranged inside the first inner volume, the cooking basket including a perforated bottom, a second lateral wall delimiting with the perforated bottom a second inner volume, and a gripping member,
- wherein the housing is configured to house at least partially the gripping member of the cooking basket, the housing being isolated from the first inner volume and second inner volume,
- wherein an angular range of the recess delimiting a rotational displacement of the cooking basket inside the bowl.

\* \* \* \* \*